(12) United States Patent
Bosser et al.

(10) Patent No.: US 12,202,178 B2
(45) Date of Patent: Jan. 21, 2025

(54) MOLDING APPARATUS FOR FORMING A FASTENING DEVICE

(71) Applicant: APLIX, Le Cellier (FR)

(72) Inventors: Damien Bosser, Le Cellier (FR); Anthony Mahe, Le Cellier (FR)

(73) Assignee: APLIX, Le Cellier (FR)

( * ) Notice: Subject to any disclaimer, the term of this patent is extended or adjusted under 35 U.S.C. 154(b) by 0 days.

(21) Appl. No.: 18/590,496

(22) Filed: Feb. 28, 2024

(65) Prior Publication Data

US 2024/0198562 A1 Jun. 20, 2024

Related U.S. Application Data

(63) Continuation of application No. 17/651,756, filed on Feb. 18, 2022, now Pat. No. 11,945,138, which is a
(Continued)

(30) Foreign Application Priority Data

Apr. 29, 2016 (FR) ........................................ 1653866
Apr. 29, 2016 (FR) ........................................ 1653870
(Continued)

(51) Int. Cl.
*B29C 33/10* (2006.01)
*A44B 18/00* (2006.01)
(Continued)

(52) U.S. Cl.
CPC ........ *B29C 43/222* (2013.01); *A44B 18/0049* (2013.01); *A44B 18/0065* (2013.01);
(Continued)

(58) Field of Classification Search
None
See application file for complete search history.

(56) References Cited

U.S. PATENT DOCUMENTS 3,708,833 A 1/1973 Ribich et al.
4,740,258 A 4/1988 Breitscheidel
(Continued)

FOREIGN PATENT DOCUMENTS

DE 102010007493 A1 8/2011
EP 0811332 A2 12/1997
(Continued)

OTHER PUBLICATIONS

International Search Report mailed Jul. 25, 2017, in International Application No. PCT/FR2017/051012 (7 pages).
(Continued)

*Primary Examiner* — Jacob T Minskey
*Assistant Examiner* — Adrien J Bernard
(74) *Attorney, Agent, or Firm* — Bookoff McAndrews, PLLC (57) ABSTRACT

A molding apparatus (10) for forming a retaining device. The molding apparatus (10) comprises a molding strip (12) and a molding support (24). The molding strip (12) has an inside face (14), an outside face (16), and a plurality of through cavities (18) extending from the outside face (16) to the inside face (14), the molding strip (12) extending in a longitudinal direction (X) and presenting both a transverse direction (Y) perpendicular to the longitudinal direction (X), and also a height direction (Z) perpendicular to the longitudinal direction (X) and to the transverse direction (Y). The inside face (14) is configured to press against a molding face (26) of the molding support (24), wherein the inside face (14) of the molding strip (12) and/or the molding face (26) of the molding support (24) includes an array of passages, the array of passages forming vents and connecting together the cavities (18) when the molding strip (12) is pressed against the molding support (24).

20 Claims, 4 Drawing Sheets

Related U.S. Application Data continuation of application No. 16/096,838, filed as application No. PCT/FR2017/051016 on Apr. 28, 2017, now Pat. No. 11,285,642.

(30) Foreign Application Priority Data

| Apr. 29, 2016 | (FR) | 1653872 |
|---|---|---|
| Apr. 29, 2016 | (FR) | 1653873 |
| Apr. 29, 2016 | (FR) | 1653888 |
| Apr. 29, 2016 | (FR) | 1653894 |
| Apr. 29, 2016 | (FR) | 1653897 |

(51) Int. Cl.

| | |
|---|---|
| *B29C 41/28* | (2006.01) |
| *B29C 41/30* | (2006.01) |
| *B29C 41/32* | (2006.01) |
| *B29C 41/38* | (2006.01) |
| *B29C 41/44* | (2006.01) |
| *B29C 43/22* | (2006.01) |
| *B29C 43/28* | (2006.01) |
| *B29C 43/46* | (2006.01) |
| *B29C 43/48* | (2006.01) |
| *B29C 43/50* | (2006.01) |
| *B29C 43/52* | (2006.01) |
| *B29C 48/00* | (2019.01) |
| *B29C 48/19* | (2019.01) |
| *B32B 3/06* | (2006.01) |
| *B32B 3/20* | (2006.01) |
| *B32B 3/30* | (2006.01) |
| *B32B 5/02* | (2006.01) |
| *B32B 5/26* | (2006.01) |
| *B32B 7/04* | (2019.01) |
| *B32B 7/12* | (2006.01) |
| *B32B 25/08* | (2006.01) |
| *B32B 25/10* | (2006.01) |
| *B32B 25/14* | (2006.01) |
| *B32B 25/16* | (2006.01) |
| *B32B 27/08* | (2006.01) |
| *B32B 27/12* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 37/15* | (2006.01) |
| *B29K 23/00* | (2006.01) |
| *B29K 101/12* | (2006.01) |
| *B29L 31/00* | (2006.01) |
| *B32B 27/36* | (2006.01) |
| *B32B 37/00* | (2006.01) |
| *B32B 37/20* | (2006.01) |

(52) U.S. Cl.

CPC .......... *A44B 18/0069* (2013.01); *B29C 33/10* (2013.01); *B29C 41/28* (2013.01); *B29C 41/30* (2013.01); *B29C 41/32* (2013.01); *B29C 41/38* (2013.01); *B29C 41/44* (2013.01); *B29C 43/28* (2013.01); *B29C 43/46* (2013.01); *B29C 43/48* (2013.01); *B29C 43/50* (2013.01); *B29C 43/52* (2013.01); *B29C 48/001* (2019.02); *B29C 48/002* (2019.02); *B29C 48/19* (2019.02); *B32B 3/06* (2013.01); *B32B 3/20* (2013.01); *B32B 3/30* (2013.01); *B32B 5/022* (2013.01); *B32B 5/024* (2013.01); *B32B 5/026* (2013.01); *B32B 5/26* (2013.01); *B32B 7/04* (2013.01); *B32B 7/12* (2013.01); *B32B 25/08* (2013.01); *B32B 25/10* (2013.01); *B32B 25/14* (2013.01); *B32B 25/16* (2013.01); *B32B 27/08* (2013.01); *B32B 27/12* (2013.01); *B32B 27/28* (2013.01); *B32B 27/302* (2013.01); *B32B 27/306* (2013.01); *B32B 27/32* (2013.01); *B32B 27/327* (2013.01); *B32B 27/32* (2013.01); *B32B 27/34* (2013.01); *B32B 37/15* (2013.01); *B29C 2043/461* (2013.01); *B29C 2043/486* (2013.01); *B29C 2791/001* (2013.01); *B29K 2023/12* (2013.01); *B29K 2101/12* (2013.01); *B29K 2713/00* (2013.01); *B29L 2031/729* (2013.01); *B32B 27/36* (2013.01); *B32B 37/0053* (2013.01); *B32B 2037/0092* (2013.01); *B32B 37/20* (2013.01); *B32B 2250/03* (2013.01); *B32B 2250/40* (2013.01); *B32B 2262/0215* (2013.01); *B32B 2262/0223* (2013.01); *B32B 2262/023* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/04* (2013.01); *B32B 2262/062* (2013.01); *B32B 2262/065* (2013.01); *B32B 2307/718* (2013.01); *B32B 2307/732* (2013.01); *B32B 2309/02* (2013.01); *B32B 2367/00* (2013.01); *B32B 2435/00* (2013.01)

(56) References Cited

U.S. PATENT DOCUMENTS

| | | |
|---|---|---|
| 4,775,310 A | 10/1988 | Fischer |
| 5,212,853 A | 5/1993 | Kaneko |
| 5,441,687 A | 8/1995 | Murasaki et al. |
| 5,518,795 A | 5/1996 | Kennedy et al. |
| 5,845,375 A | 12/1998 | Miller et al. |
| 6,206,679 B1 | 3/2001 | Provost et al. |
| 6,432,339 B1 | 8/2002 | Jens et al. |
| 6,684,464 B1 | 2/2004 | Mody et al. |
| 7,350,276 B2 | 4/2008 | Minato et al. |
| 8,168,103 B2 | 5/2012 | Cheng |
| 8,609,218 B2 | 12/2013 | Cheng |
| 8,819,902 B2 | 9/2014 | Tuma |
| 9,918,525 B2 | 3/2018 | Gallant et al. |
| 10,016,022 B2 | 7/2018 | Nakada et al. |
| 10,106,659 B2 | 10/2018 | Maeda et al. |
| 10,646,004 B2 | 5/2020 | Nakada et al. |
| 2001/0001283 A1 | 5/2001 | Kennedy et al. |
| 2002/0116799 A1 | 8/2002 | Martin et al. |
| 2002/0190418 A1 | 12/2002 | Jens et al. |
| 2003/0041957 A1 | 3/2003 | Harvey et al. |
| 2004/0134045 A1 | 7/2004 | Poulakis et al. |
| 2004/0229739 A1 | 11/2004 | Gorman et al. |
| 2005/0060849 A1 | 3/2005 | VanBenschoten et al. |
| 2006/0247567 A1 | 11/2006 | Baldauf et al. |
| 2009/0064469 A1 | 3/2009 | Dowd |
| 2010/0101056 A1 | 4/2010 | Cheng |
| 2010/0239699 A1 | 9/2010 | Banker et al. |
| 2012/0052245 A1 | 3/2012 | Hoium et al. |
| 2012/0174348 A1 | 7/2012 | Cheng |
| 2012/0308755 A1 | 12/2012 | Gorman et al. |
| 2013/0280474 A1 | 10/2013 | Medina et al. |
| 2014/0103567 A1 | 4/2014 | Collins et al. |
| 2014/0237779 A1 | 8/2014 | Gallant et al. |
| 2015/0010732 A1 | 1/2015 | Tuma et al. |
| 2015/0272790 A1 | 10/2015 | Fujisaki et al. |
| 2017/0099915 A1 | 4/2017 | Nakada et al. |
| 2018/0271228 A1 | 9/2018 | Nakada et al. |
| 2018/0360170 A1 | 12/2018 | Fukuhara et al. |
| 2018/0368534 A1 | 12/2018 | Fukuhara et al. |
| 2019/0008239 A1 | 1/2019 | Fukuhara et al. |
| 2020/0196715 A1 | 6/2020 | Fukuhara et al. |
| 2020/0196716 A1 | 6/2020 | Fukuhara et al. |
| 2020/0237058 A1 | 7/2020 | Nakada et al. |
| 2021/0106101 A1 | 4/2021 | Fukuhara et al. |

(56) References Cited

U.S. PATENT DOCUMENTS

FOREIGN PATENT DOCUMENTS

| EP | 1783257 | B1 | 4/2009 |
|---|---|---|---|
| EP | 2850961 | A1 | 3/2015 |
| FR | 2129663 | | 10/1972 |
| JP | S36009983 | B | 7/1961 |
| JP | S51002512 | B | 1/1976 |
| JP | H08187113 | A | 7/1996 |
| JP | H09308509 | A | 12/1997 |
| JP | H09322811 | A | 12/1997 |
| JP | 2000236919 | A | 9/2000 |
| JP | 2005185458 | A | 7/2005 |
| JP | 2010110537 | A | 5/2010 |
| JP | 2015504736 | A | 2/2015 |
| JP | 2016030379 | A | 3/2016 |
| KR | 1020070116878 | A | 12/2007 |
| RU | 2151059 | C1 | 6/2000 |
| RU | 2193968 | C2 | 12/2002 |
| RU | 2534245 | C2 | 11/2014 |
| WO | 9815201 | A1 | 4/1998 |
| WO | 0050208 | A2 | 8/2000 |
| WO | 0167911 | A2 | 9/2001 |
| WO | 02091869 | A1 | 11/2002 |
| WO | 2005090046 | A1 | 9/2005 |
| WO | 2010109087 | A1 | 9/2010 |
| WO | 2010130886 | A1 | 11/2010 |
| WO | 2011097436 | A1 | 8/2011 |
| WO | 2013156368 | A1 | 10/2013 |
| WO | 2014064843 | A1 | 5/2014 |

OTHER PUBLICATIONS

International Search Report mailed Jul. 26, 2017, in International Application No. PCT/FR2017/051015 (7 pages).
International Search Report mailed Jul. 27, 2017, in International Application No. PCT/FR2017/051011 (9 pages).
International Search Report mailed Jul. 27, 2017, in International Application No. PCT/FR2017/051014 (7 pages).
International Search Report mailed Jul. 31, 2017, in International Application No. PCT/FR2017/051016 (6 pages).
International Search Report mailed Sep. 7, 2017, in International Application No. PCT/FR2017/051006 (7 pages).
International Search Report mailed Sep. 7, 2017, in International Application No. PCT/FR2017/051010 (7 pages).
Office Action in JP Application No. 2018-556274, dated Mar. 11, 2021 (7 pages).
Office Action in JP Application No. 2018-556286, dated Apr. 2, 2021 (7 pages).
Office Action in JP Application No. 2018-556480, dated Mar. 23, 2021 (9 pages).
Office Action in JP Application No. 2018-556495, dated Apr. 21, 2021 (24 pages).
Office Action in JP Application No. 2018-556500, dated Mar. 23, 2021 (14 pages).
Office Action in KR Application No. 10-2018-7034590, dated Feb. 23, 2021 (12 pages).
Office Action in Russian Application No. 2018141814, issued on May 12, 2020 (8 pages).
Search Report issued in corresponding European Application No. 23178325.9, mailed Oct. 17, 2023.

MOLDING APPARATUS FOR FORMING A FASTENING DEVICE

BACKGROUND OF THE INVENTION

The present disclosure relates to the field of retaining devices, and in particular to the field of apparatuses for fabricating retaining devices with hooks.

Conventional apparatuses for making closure systems comprising self-gripping elements such as hooks conventionally make use of means for dispensing a plastics material into cavities formed in a molding roller or in a molding strip.

Furthermore, the plastics material is distributed into the cavities in such a manner that, on the plastics material dispenser means side, the material forms a continuous tape forming a base for the hooks or the hook preforms that are molded in the cavities.

The plastics material may be dispensed into the cavities by pressing extruded plastics material into the cavities, e.g. by using a pressure roller, or by injecting plastics material directly into the cavities.

Apparatuses for fabricating retaining device with hooks are known that comprise a molding strip, which is a strip forming a closed loop and tensioned over rotary drive means, e.g. two rollers. The plastics material is injected or pressed into the cavities in the molding strip facing one of the drive rollers or facing a molding support. The drive roller or the molding support thus closes the cavities of the molding strip facing the location where the plastics material is injected or pressed so as to define a given volume of plastics material that is to form a preform for the hooks or the hooks themselves.

Nevertheless, in the light of economic necessities, the travel speeds of the molding strip are such that while the plastics material is being dispensed into the cavities, it is possible that each cavity (or only some of them) is/are not completely filled with plastics material and that pockets of air become trapped in the cavities. As a result, not all of the preforms or hooks are formed in optimum manner on the base, and the performance of the retaining device with hooks may be diminished.

OBJECT AND SUMMARY OF THE INVENTION

The present disclosure seeks to remedy those drawbacks, at least in part.

To this end, the present disclosure provides a molding apparatus for forming a retaining device, the molding apparatus comprising a molding strip and a molding support, the molding strip having an inside face, an outside face, and a plurality of through cavities extending from the outside face to the inside face, the molding strip extending in a longitudinal direction and presenting both a transverse direction perpendicular to the longitudinal direction, and also a height direction perpendicular to the longitudinal direction and to the transverse direction, the inside face being configured to press against a molding face of the molding support, wherein the inside face of the molding strip and/or the molding face of the molding support includes an array of passages, the array of passages forming vents and connecting together the cavities when the molding strip is pressed against the molding support.

By way of example, the molding strip is a molding strip that forms a closed loop tensioned over rotary drive means for the molding strip, e.g. two rotary drive rollers. One of the rotary drive rollers of the molding strip may act as a molding support. The molding support could equally well be distinct from the rotary drive means.

In the molding apparatus, the plastics material is injected into the cavities via the outside face of the molding strip, facing the molding support, i.e. while the inside face of the molding strip is pressed against the molding face of the molding support.

Because of the vent-forming array of passages connecting the cavities to one another when the molding strip is pressed against the molding support, i.e. when the inside face of the molding strip is pressed against the molding face of the molding support, the cavities are not completely closed during injection of the plastics material. The cavities are therefore not airtight.

Thus, while the plastics material is reinjected into the cavities, even when the molding strip is traveling at high speed, the plastics material injected into each cavity pushes out the air present therein to the array of passages, and the air escapes to the atmosphere via the vents formed by the array of passages between the molding strip and the molding support. Air can escape to the atmosphere via the cavities that are not full of plastics material and that are connected, via the array of passages, to cavities that are being filled. Air can also escape to the atmosphere via the sides of the strip of the molding strip. It is thus possible to fabricate retaining devices at high speeds and to reduce considerably the pressure that is needed for filling the molding cavities, and also the force that needs to be supplied for unmolding the preforms and/or hooks.

It can be understood that air is no longer trapped in the cavities by the plastics material, and therefore does not oppose filling of the cavities by the plastics material. Also, it is ensured that the cavities are optimally filled with the plastics material, subsequently making it possible, for example, to obtain a retaining device with hooks that presents good hooking performance with a counterpart having loops and/or a counterpart having hooks. The "suction-cup" effect during unmolding of the hooks and/or preforms is then reduced, or even eliminated. The stresses exerted on the tape during unmolding are considerably reduced.

The inside face of the molding strip and/or the molding face of the molding support may present a maximum roughness height Rz that is greater than or equal to 1.0 micrometer (μm), preferably greater than or equal to 3.0 μm, and less than or equal to 50.0 μm.

The array of passages is formed by the roughness of the inside face of the molding strip and/or by the roughness of the molding face of the molding support. This roughness serves to form vents that serve to discharge air from the cavities into which the plastics material is being injected. Nevertheless, this roughness serves to control the quantity of plastics material that can leave the cavity via the inside face of the molding strip.

This roughness may be obtained by sanding the inside face of the molding strip and/or the molding face of the molding support with glass paper, e.g. with glass paper having grain size lying in the range 16 to 400, and in particular 240.

This roughness can also be obtained by sandblasting the inside face of the molding strip and/or the molding face of the molding support.

This roughness may also be obtained by chemical or laser graining, by knurling, or indeed by plasma spraying.

The inside face may present a rim surrounding the open portion of each cavity and projecting from the inside face, the rims defining between them the array of passages, each rim possibly presenting various heights, such that when the molding strip is pressed against the molding support, at least a portion of each rim is not pressed against the molding support, such that each cavity is in connection with the atmosphere via the array of passages.

Since the open portion of each cavity is surrounded by a rim projecting from the inside face of the molding strip, a portion of the array of passages is formed by the inside face of the molding strip, between the rims. Furthermore, since each rim presents varying height, when the molding strip is pressed against the molding support, at least a portion of the rim is not pressed against the molding support, such that a portion of the array of passages is also formed by the rim.

It can be understood that the height of the rim is measured relative to the outside face of the molding strip and that this height is the maximum height of the rim, measured in a section on plane parallel to the height direction, i.e. parallel to the axis of the cavities, and passing via the cavity.

A maximum difference between two heights of a given rim of a cavity may be greater than or equal to 1.0 µm, preferably greater than or equal to 2.0 µm, more preferably greater than or equal to 4.0 µm, and less than or equal to 100.0 µm, preferably less than or equal to 50.0 µm.

Since the rim presents varying height, a plurality of maximum heights of a given rim are compared as measured in various different section planes parallel to the height direction, and a maximum difference is determined between all of those heights, this maximum difference being greater than or equal to 1.0 µm so as to form an air passage between the cavity and the remainder of the array of passages.

Preferably, the maximum difference is greater than or equal to 6.0 µm, more preferably greater than or equal to 8.0 µm.

Preferably, the maximum difference is less than or equal to 50 µm.

The array of passages may extend in the longitudinal direction.

It can be understood that when the molding strip is pressed against the molding support, the array of passages enables vents to be formed that allows air to be discharged in the longitudinal direction. It can be understood that the array of passages may be formed solely by passages that are strictly parallel to the longitudinal direction.

The array of passages may extend in the transverse direction.

It can be understood that when the molding strip is pressed against the molding support, the array of passages enables vents to be formed that allows air to be discharged in the transverse and/or the longitudinal direction. It can be understood that the array of passages may be formed solely by passages that are strictly parallel to the transverse direction.

The array of passages may also be formed by passages extending parallel to the longitudinal direction and passages extending parallel to the transverse direction.

Each cavity may define a stem extending from the outside face towards the inside face and may have a head-forming end extending away from the stem towards the inside face of the molding strip. Each cavity may also define a stem, extending between the outside face and the inside space across the entire thickness of the molding strip.

It is thus possible to form a retaining element presenting a stem and a head, the head being connected to the base of the tape by the stem.

Each cavity of the molding strip may be configured to form a preform of a retaining element.

Thereafter, the preform may be deformed by known means in order to form a retaining element, or as described in detail in patent application number FR 1653894, incorporated by reference.

The molding support may be a molding roller.

Thus, one of the drive rollers of the molding strip is used as a molding support.

The molding strip may comprise 10 cavities per square centimeter (cavities/cm$^2$) to 500 cavities/cm$^2$, in particular 250 cavities/cm$^2$±75 cavities/cm$^2$.

Each cavity may have a height in the height direction greater than or equal to 5.0 µm, preferably greater than or equal to 20.0 µm, still more preferably greater than or equal to 100.0 µm, and less than or equal to 5000.0 µm, preferably less than or equal to 800.0 µm, still more preferably less than or equal to 500.0 µm.

When the cavities are not surrounded by respective rims, the height of the cavity is measured between the inside and outside faces of the molding strip, e.g. relative to two midplane surfaces defining each face.

When the cavities are surrounded by respective rims, the height of the cavity is measured from the outside face of the molding strip and relative to the highest point of the rim measured in a section plane parallel to the height direction, i.e. parallel to the axis of the cavity, and contained in the cavity.

The molding strip may comprise a material based on nickel.

Nickel makes it possible in particular to form the continuous endless or "looped" molding strip as a single piece made entirely of nickel. The molding strip therefore does not present any material discontinuity and thus any junction that might give rise to weakness in the molding strip. Specifically, if the molding strip is welded to form a loop, the weld zone is a zone of weakness in the molding strip.

The term "material based on nickel" is used to cover materials in which the mass content of nickel is in the majority. It can be understood that nickel is thus the element having the highest mass content in the material. By way of example, the nickel-based material is a metal alloy based on nickel having a mass content of at least 40% nickel, preferably at least 60% nickel, still more preferably at least 80% nickel.

The molding strip may also be made of nickel-plated steel, i.e. the molding strip is made from a strip of steel having the cavities perforated therein, and subsequently the strip of steel is covered in a plurality of layers of nickel, e.g. by electroplating.

This molding strip made out of nickel-plated steel comprises 5% to 20% by mass of nickel.

The molding strip may be obtained by an additive manufacturing method, e.g. by chemical or electrochemical deposition, by sintering a powder by laser, by lithography, by galvanoplasty, by electroforming, . . .

In the longitudinal direction, the molding strip may present a length lying in the range 0.5 meters (m) to 5 m.

In the transverse direction, the molding strip may present width lying in the range 5 millimeters (mm) to 3000 mm.

Each cavity may present symmetry of rotation about an axis parallel to the height direction.

A retaining element or preform is thus formed that presents symmetry of rotation about an axis perpendicular to the base of the tape. It can be understood that during unmolding of the tape, the retaining elements or the preforms may be deformed plastically so that they no longer present symmetry of rotation after unmolding.

A portion of the array of passages surrounding at least one of the cavities may present a shape that is substantially hexagonal This hexagonal shape makes it possible to arrange the cavities relative to one another in a "honeycomb" or staggered configuration. This arrangement of cavities makes it possible to achieve a dense arrangement of retaining elements.

A different maximum between the height of at least one of the rims and the height of a passage adjacent to said rim may be less than or equal to 100.0 µm.

Preferably, a different maximum between the height of at least one of the rims and the height of a passage adjacent to said rim may be less than or equal to 75.0 µm, still more preferably less than or equal to 50.0 µm.

The height of a passage is measured from the outside face of the molding strip, at the point presenting the minimum passage height when the passage height is measured in various different section planes parallel to the height direction.

BRIEF DESCRIPTION OF THE DRAWINGS

Other characteristics and advantages of the invention appear from the following description of embodiments of the invention given as non-limiting examples and with reference to the accompanying figures, in which.

DETAILED DESCRIPTION OF THE INVENTION

Figure 1:
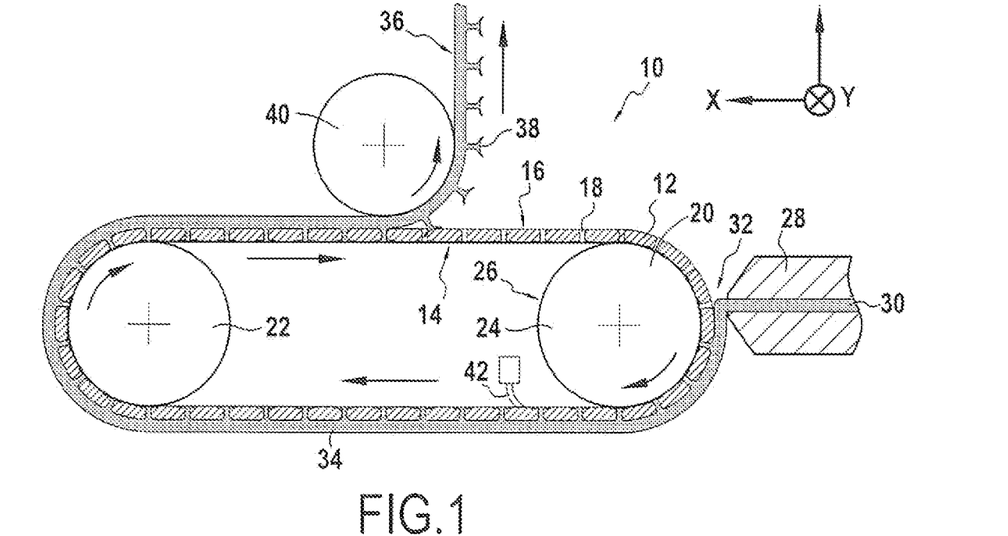
FIG. 1 is a diagrammatic cross-section view of a molding apparatus for forming a retaining device.

FIG. 1 is a diagrammatic cross-section view of a molding apparatus 10 for forming a retaining device. Said molding apparatus 10 comprises a molding strip 12 forming a closed loop and having an inside face 14, an outside face 16, and a plurality of through cavities 18 extending from the outside face 16 to the inside face 14.

The molding strip 12 is tensioned over means for imparting rotary drive to the molding strip 12, e.g. two rotary drive rollers 20 and 22. One of the rotary drive rollers 20 for the molding strip 12 may act as a molding support 24. In particular, only one of the two rollers needs to be driven in rotation by motor-drive means, e.g. the roller 24, while the other roller 22 is idle (without motor-drive means) and is driven in rotation by the molding strip, itself being driven by the roller 21.

The molding support 24 has a molding face 26 that is to press against the inside face 14 of the molding strip 12. The inside face 14 of the molding strip 12 presses against the rotary drive rollers 20 for driving the molding strip 12.

The molding apparatus 10 also has a dispenser device 28 for dispensing the plastics material 30 into the cavities 18 of the molding strip 12. In FIG. 1, the dispenser device 28 for dispensing a material, e.g. a plastics material 30, is arranged on the outside face 16 side of the molding strip 12, facing the molding support 26, i.e. the plastics material 30 is dispensed into the cavities 18 of the molding strip while the inside face 14 of the molding strip 12 is pressed against the molding face 26 of the molding support 24.

For example, the dispenser device 28 may be a plastics material injector head. The plastics material injector head (or extruder head) has an opening of width in the transverse direction that is less than or equal to the width in the transverse direction of the molding strip 12.

In FIG. 1, the dispenser device 28 is arranged at a certain distance from the outside face 16 of the molding strip 12 so as to form a gap 32 between the molding strip 12 and the dispenser device 28.

While dispensing plastics material 30 into the cavities 18 of the molding strip 12, a base 34 is also formed on the outside face 16 of the molding strip 12 so that, after unmolding, a tape 36 is formed comprising a base 34 having a plurality of retaining elements 38 or a plurality of retaining element preforms thereon.

The molding apparatus 10 also has an unmolding roller 40. By way of example, the unmolding roller 40 may be configured to separate the base 34 of the tape 36 from the molding strip 12 under the effect of the tension of the tape 36 and of its change in direction. The unmolding roller 40 may be a suction roller and may have a rubber coating in order to make unmolding easier.

It should be observed that the molding apparatus 10 may also have a device for removing excess plastics material, such as a scraper 42 arranged in the example of FIG. 1 on the inside face 14 side of the molding strip 12 and after the molding support 24 in the travel direction of the molding strip 12. It can thus be understood that the scraper 42 is arranged after the dispenser device 28.

Figure 2:
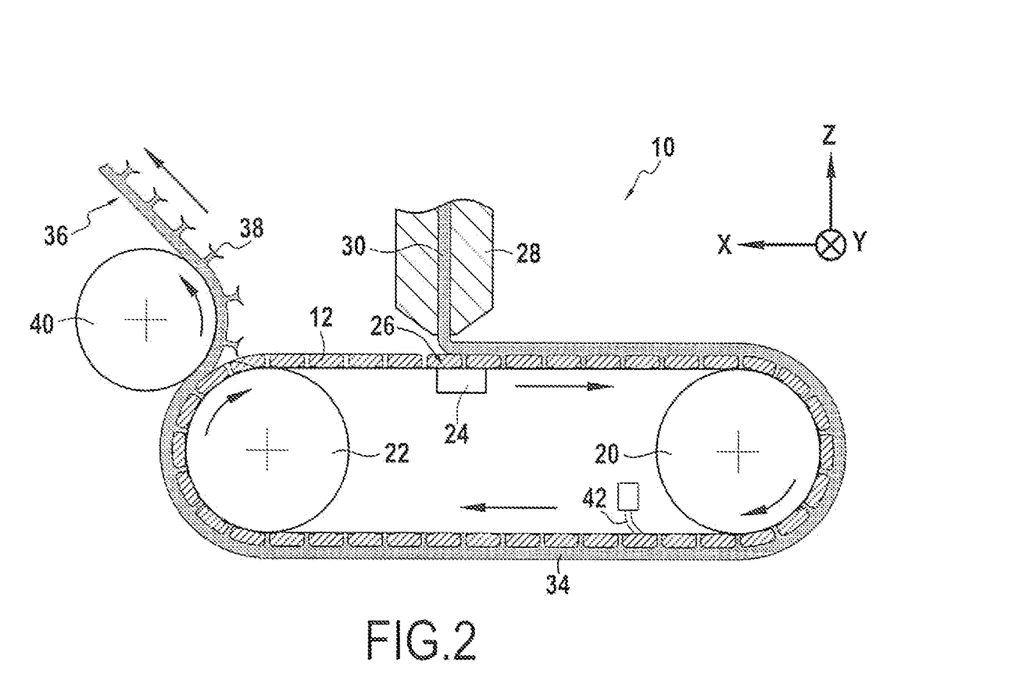
FIG. 2 is a diagrammatic cross-section view of another molding apparatus for forming a retaining device.

FIG. 2 is a diagrammatic cross-section view of another molding apparatus 10 for forming a retaining device.

Below, elements that are common to the various embodiments are identified by the same reference numbers.

The molding apparatus 10 of FIG. 2 differs from the molding apparatus 10 of FIG. 1 in that, in FIG. 2, the molding support 24 is distinct from the rotary drive rollers 20 of the molding strip 12.

The longitudinal direction X is defined in the travel direction of the molding strip 12, the transverse direction Y is perpendicular to the longitudinal direction X, and the height direction Z is perpendicular to both the longitudinal direction X and the transverse direction Y. The XY plane defines a plane of the molding strip 12 between the two rotary drive rollers 20, 22 of the molding strip.

In the longitudinal direction, the molding strip 12 may present a length (or perimeter) lying in the range 0.5 m to 5 m when the molding strip 12 is cut and laid out flat.

In the transverse direction, the molding strip 12 may present a width lying in the range 5 mm to 3000 mm. The width of the molding strip 12 may be equal to 50 mm, 100 mm, or 200 mm, for example.

The molding strip 12 may also have 10 cavities/cm$^2$ to 500 cavities/cm$^2$. By way of example, the molding strip 12 may have 250 cavities/cm$^2$±75 cavities/cm$^2$.

Figure 3:
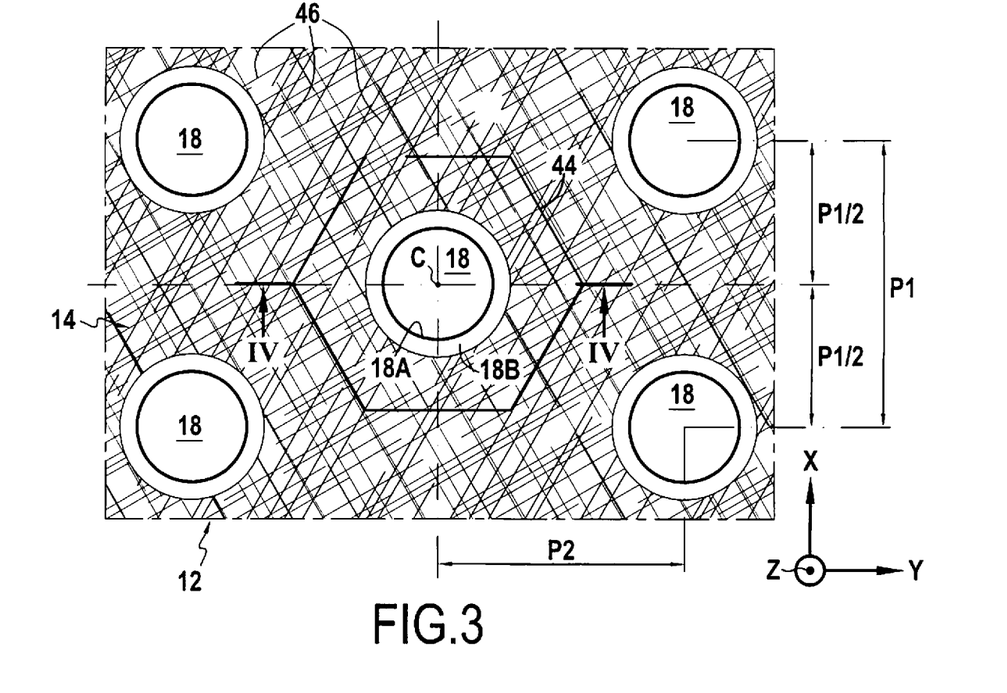
FIG. 3 is a diagrammatic view of the inside face of a molding strip in a first embodiment of the molding strip.

FIG. 3 is a view of the inside face 14 of a molding strip 12. This molding strip 12 has cavities 18 and it presents a maximum roughness height Rz of 3.23 µm measured in compliance with the ISO 4287 and ISO 4288 standards. This roughness has been measured along the profile 44. Furthermore, along a given profile 44, the arithmetical mean deviation Ra of the roughness profile is 532.21 nanometers (nm), likewise measured in compliance with the ISO 4287 and ISO 4288 standards. This roughness is obtained by sanding the inside face 14 of the molding strip 12 with glass paper, e.g. 240 grain glass paper. The sanding of the inside face 14 creates polishing scratches forming an array of passages 46 in the inside face 14 of the molding strip 12.

In FIG. 3, each cavity 18 presents symmetry of rotation about an axis C parallel to the height direction Z.

In FIG. 3, it can be seen that the cavities 18 are in alignment along the longitudinal direction X and form a plurality of rows in the longitudinal direction X. In the embodiment of FIG. 3, the cavities 18 of a row are spaced apart from one another by a pitch P1, the pitch P1 being measured between the axes C of two immediately adjacent cavities 18 in the same row. Two immediately adjacent rows are spaced apart from each other by a pitch P2, the pitch P2 being measured in the transverse direction, and the cavities of two rows being offset from one another in the longitudinal direction by one-half of the pitch P1, i.e. by the pitch P1 divided by 2, also written P1/2. This offset value is not limiting in any way. In the example of FIG. 3, the pitch P1 is strictly greater than the pitch P2.

Figure 4A:
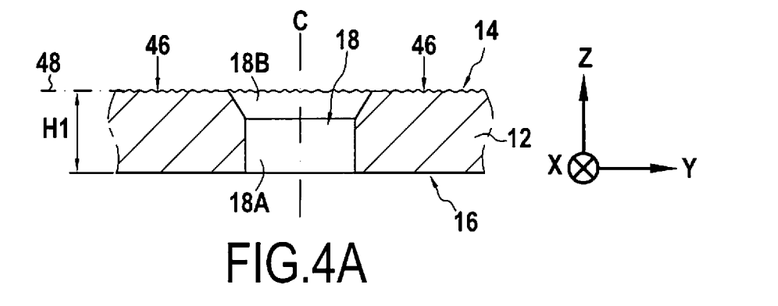
FIG. 4A is a cross-section view of the molding strip centered on the cavity in section plane IV-IV of FIG. 3.

FIG. 4A is a partial cross-section view of the molding strip 12 centered on the cavity 18, shown in section on section plane IV-IV of FIG. 3. This section plane IV-IV is parallel to the ZY plane and contains the axis C of the cavity 18. The molding strip 12 presents an outside face 16 and an inside face 14. The inside face 14 presents roughness as defined above. The height H1 of the cavity 18 as measured in the height direction Z is measured relative to two midplane surfaces each defining one of the faces, and in the present example between the outside face 14 of the membrane and an imaginary surface 48 represented in FIG. 4A by a midplane of the inside face 14.

In the height direction Z, each cavity 18 has a height H1 that is greater than or equal to 5.0 µm, preferably greater than or equal to 20.0 µm, still more preferably greater than or equal to 100 µm, and less than or equal to 5000.0 µm, preferably less than or equal to 800.0 µm, still more preferably less than or equal to 500.0 µm.

The cavity 18 has a first portion 18A defining a stem of the retaining element 38 and a second portion 18B forming one end of the cavity 18 that extends from the stem towards the inside face 14 of the molding strip 12 for forming a head (or a preform) of the retaining element 38. The first portion 18A defining the stem may be of cylindrical or frustoconical shape. For example, the first portion 18A may present a diameter that decreases on going away from the outside face 16 and towards the inside face 14. The second diameter 18B forming the head typically extends radially or transversely relative to an axis parallel to the axis of the stem, i.e. parallel to the height direction. In particular, the diameter of the head becomes larger on going away from the portion 18A towards the inside face 14 of the molding strip 12. More particularly, the head is substantially frustoconical in shape. In a variant, it is possible to envisage forming a head that presents the shape of a hexahedron. In a variant, it is also possible to envisage that the cavity presents at least a portion of a rotary hyperboloid or hyperboloid of revolution.

Figure 4B:
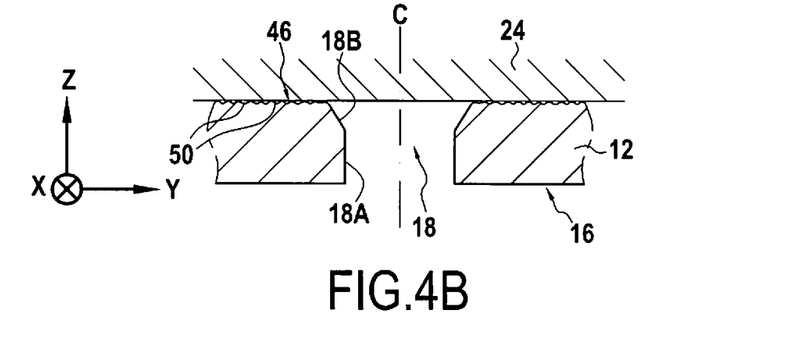
FIG. 4B is a sectional view of the molding strip centered on the cavity in section plane IV-IV of FIG. 3, with the molding strip pressed against the molding support.

The roughness of the inside face 14 of the molding strip 12 forms the array of passages 46, the array of passages 46 forming vents 50 and connecting together the cavities 18 when the molding strip 12 is pressed against the molding support 24, i.e. when the inside face 14 of the molding strip 12 is pressed against the molding face 26 of the molding support 24, as shown in FIG. 4B.

Figure 5:
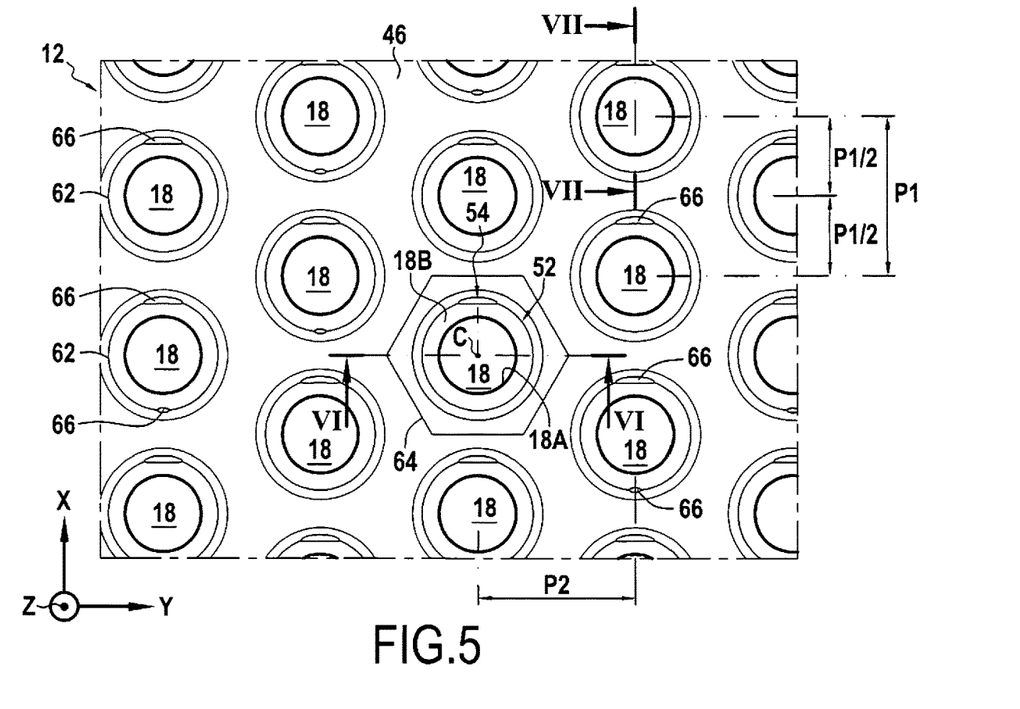
FIG. 5 is a diagrammatic view from above of the inside face of a molding strip in a second embodiment of the molding strip.
Figure 6A:
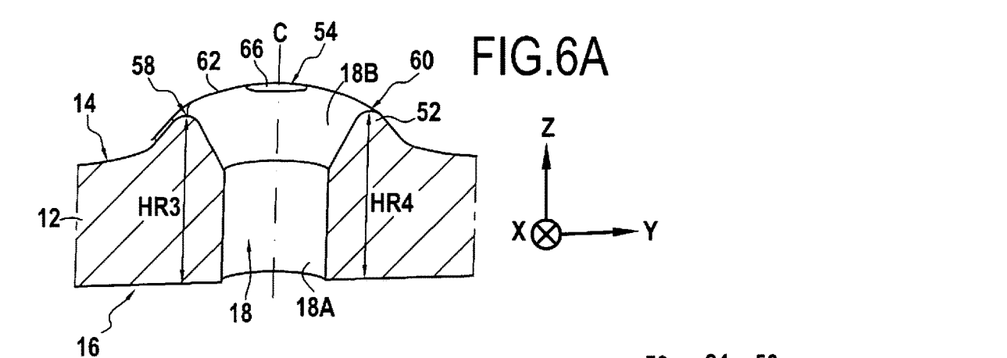
FIG. 6A is a partial cross-section view in perspective showing the molding strip in section plane VI-VI of FIG. 5.
Figure 6B:
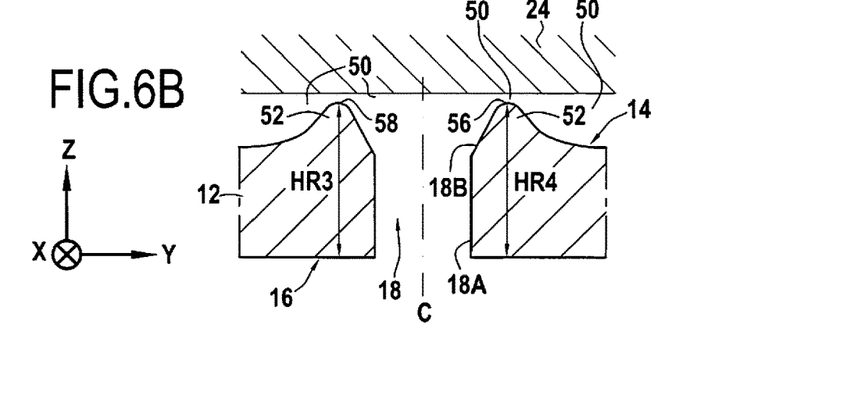
FIG. 6B is a sectional view of the molding strip centered on the cavity in section plane VI-VI of FIG. 5, with the molding strip pressed against the molding support.
Figure 7A:
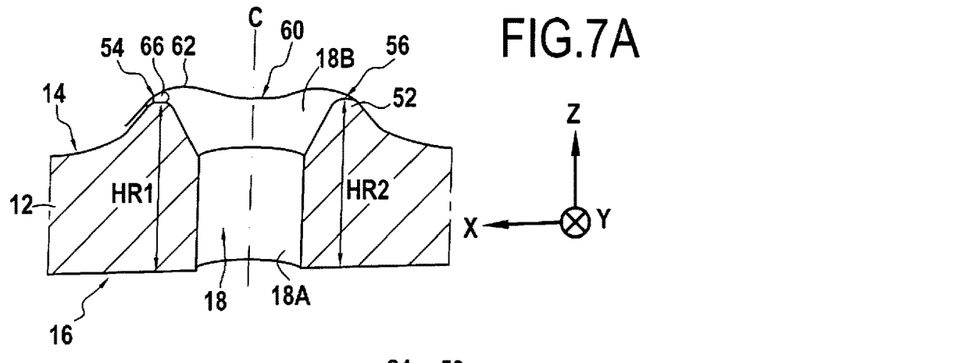
FIG. 7A is a partial cross-section view in perspective of the molding strip in section plane VII-VII of FIG. 5.
Figure 7B:
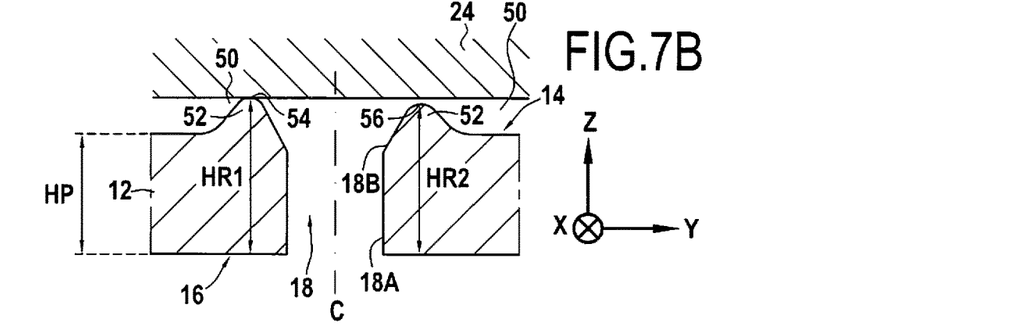
FIG. 7B is a sectional view of the molding strip centered on the cavity in section plane VII-VII of FIG. 5, with the molding strip pressed against the molding support.

FIG. 5 is a view of the inside face 14 of a molding strip 12 in another embodiment of the molding strip 12. This molding strip 12 has cavities 18. As in the embodiment of FIG. 3, cavities 18 can be seen in FIG. 5 that are aligned in the longitudinal direction X so as to form a plurality of rows in the longitudinal direction X. In the embodiment of FIG. 5, the cavities 18 of a row are spaced apart from one another at a pitch P1, the pitch P1 being measured between the axes C of two adjacent cavities 18 in the same row. Two immediately adjacent rows are spaced apart from each other by a pitch P2, the pitch P2 being measured in the transverse direction, and the cavities of two rows are offset from one another in the longitudinal direction by one-half of the pitch P1, i.e. by a pitch P1 divided by 2, also written P1/2. Although identified by the same numerical references, it can be understood that the pitches P1 and P2 may differ between the embodiment of FIG. 3 and the embodiment of FIG. 5. Thus, in the example of FIG. 5, the pitch P1 is strictly greater than the pitch P2.

It should be observed that the array of passages 46 formed between the rims 52 includes a portion 64 of the array of passages 46 that surrounds a cavity 18 and that is substantially hexagonal in shape. More particularly, it is the bottom of the array of passages 46 surrounding a cavity 18 that presents this substantially hexagonal shape.

In FIG. 5, the inside face 14 of the molding strip 12 presents a rim 52 surrounding an open portion of each cavity 18 and projecting from the inside face 14 of the molding strip 12.

In FIG. 5, each cavity 18 presents symmetry of rotation about an axis C parallel to the height direction Z. Nevertheless, the rim 52 need not present symmetry of rotation.

Thus, like the rim 52 projecting from the inside face 14 of the molding strip 12, a portion of the array of passages 46 is formed by the inside face 14 of the molding strip 12 between the rims 52. Furthermore, since each rim 52 presents varying heights HR1, HR2, HR3, and HR4, when the molding strip 12 is pressed against the molding support 24, at least a portion of the rim 52 does not press against the molding support 24, such that a portion of the array of passages 46 is also formed by a portion of the rim 52. The area of the molding strip pressed against the face of the molding support is strictly less than 100% (not taking account of the area of the cavities), and more particularly less than 98%. The pressed area is greater than 5%. In certain embodiments, the area of the molding strip pressed against the face of the molding support lies in the range 15% to 45%.

In certain embodiments, the area of the molding strip pressed against the face of the molding support lies in the range 55% to 90%.

As shown in FIGS. 6A, 6B, 7A, and 7B, each rim 52 presents varying heights HR1, HR2, HR3, and HR4. These heights are measured relative to the outside face 16 of the molding strip 12. Furthermore, these heights HR1, HR2, HR3, and HR4 are the maximum heights of the rims 52 measured in a section plane parallel to the height direction Z, i.e. parallel to the axis C of the cavities 18 and passing via the cavities 18. Preferably, the section plane contains the axis C. Specifically, in the section plane, in a section view, the rim 52 presents a maximum height.

In the height direction Z, each cavity 18 has at least one height HR1, HR2, HR3, or HR4 that is greater than or equal to 5.0 µm, preferably greater than or equal to 20.0 µm, still more preferably greater than or equal to 100.0 µm, and less than or equal to 5000.0 µm, preferably less than or equal to 800.0 µm, still more preferably less or equal to 500.0 µm.

In the embodiment of FIG. 5, the rim 52 presents two maxima 54, 56 and two minima 58, 60, the two maxima 54, 56 being separated by a minimum and the two minima 58, 60 being separated by a maximum. Thus, when going around the rim 52, along the line of maximum heights 62, i.e. the succession of maximum heights of the profile as measured in a section plane of the cavity 18, a first maximum 54 is crossed and then a first minimum 58 prior to crossing a second maximum 56 and then a second minimum 60 in order to return to the first maximum 54.

In the example of FIGS. 5, 6A, 6B, 7A, and 7B, the maxima 54 and 56 correspond respectively to the heights HR1 and HR2, and the minima 58 and 60 correspond respectively to the heights HR3 and HR4.

In the examples of FIGS. 5, 6A, 6B, 7A, and 7B, the height HR1 of the first maximum 54 is different from the height HR2 of the second maximum 56. Likewise, the height HR3 of the first minimum 58 is different from the height HR4 of the second minimum 60.

For example, a maximum difference between two heights of a given rim 52 of a cavity 12 may be greater than or equal to 1.0 µm, preferably greater than or equal to 2.0 µm, still more preferably greater than or equal to 4.0 µm and less than or equal to 100.0 µm, preferably less than or equal to 50.0 µm. For example, if it is considered that HR1 is greater than HR2 and that HR3 is greater than HR4, the maximum difference is measured between HR1 and HR4 and may for example be equal to 14.0 µm.

Thus, since the rim 52 presents varying height, comparisons are made between a plurality of maximum heights of a given rim 52, i.e. the maximum heights of the rim 52 measured in various different section planes parallel to the height direction, in other words, the height of the rim 52 taken along the line 62 of maximum heights. A maximum difference between all of these heights is determined, which maximum difference is greater than or equal to 1.0 µm, for example, so as to form an air passage between the cavity 18 and the remainder of the array of passages 46.

It should also be observed that a maximum difference between the height of at least one of the rims 52 and a height HP of a passage 46 adjacent to said rim 52 is less than or equal to 100.0 µm, e.g. equal to 35.0 µm.

It can be seen that the rim 52 has a plateau 66 at the maximum 54. In FIG. 5, the plateau 66 is substantially oblong in shape and presents a direction in the longitudinal direction of about 150.0 µm and a dimension in the transverse direction of about 45.0 µm.

While the molding strip 12 is in use, the dimensions of these plateaus 66 tend to increase as a result of friction wear between the molding strip 12 and the molding support 24. Thus, on a new molding strip 12, these plateaus 66 need not be present or may be present only on one of the maxima of the rim 52. Thereafter, as a result of repeated contacts between the molding strip 12 and the molding support 24 and/or the rotary drive rollers 20, 22 for driving the molding strip 12, the plateaus 66 may become present at all of the maxima of the rim 52 and their dimensions may vary from one rim to another and over time.

Figure 8:
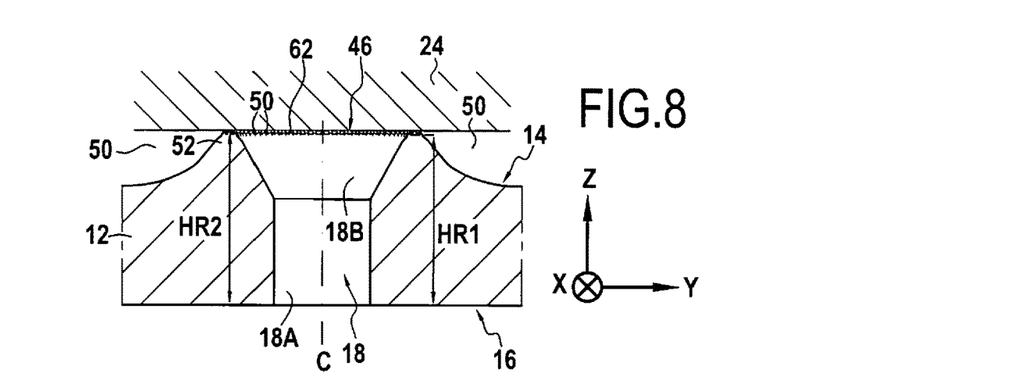
FIG. 8 is a partial cross-section view of a cavity in another embodiment of the molding strip, with the molding strip pressed against the molding support.

FIG. 8 is a fragmentary view in section and in perspective of a cavity 18 in another embodiment of the molding strip 12, the molding strip 12 being pressed against the molding support 24.

In the example of FIG. 8, the rim 52 that surrounds the cavity 18 and that projects from the inside face 14 of the molding strip 12 presents a line 62 of maximum heights comprising a succession of maxima and minima, such that when the molding strip 12 is pressed against the molding support 24, the cavity 18 is in connection with the atmosphere and with the other cavities via the array of passages 46 forming vents 50.

FIG. 8 may also represent a molding strip 12 in which the rim 52 that surrounds the cavity 18 and that projects from the inside face 14 of the molding strip 12 presents a line 62 of maximum heights that is substantially constant, i.e. the height HR measured from the outside face 16 are substantially equal, presenting a maximum roughness height Rz greater than or equal to 1.0 µm, and preferably greater than or equal to 3.0 µm and less than or equal to 50.0 µm.

Figure 9:
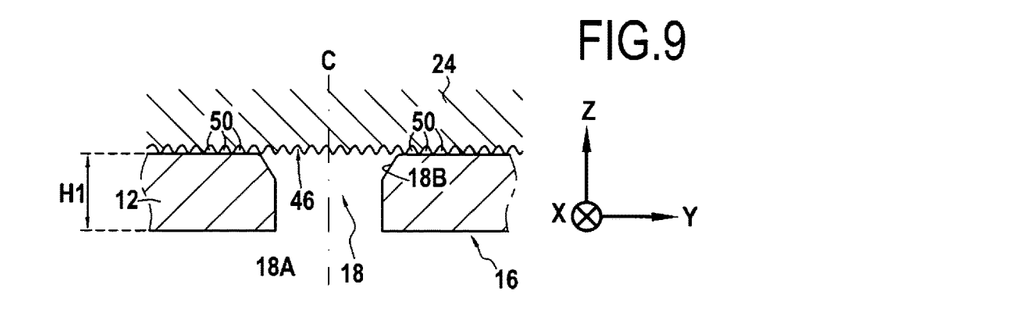
FIG. 9 is a sectional view of another embodiment of the molding support with the molding strip pressed against the molding support.

FIG. 9 shows an embodiment of the molding apparatus 10 in which the molding support 24 presents a maximum roughness height Rz greater than or equal to 1.0 µm, preferably greater than or equal to 3.0 µm, and less than or equal to 50.0 µm.

In the embodiment of FIG. 9, the molding strip 12 does not have a rim. Nevertheless, it is possible to envisage combining the molding support 24 of FIG. 9 with any one of the embodiments of the molding strip described above.

Thus, the inside face 14 of the molding strip 12 could equally well present a maximum roughness height Rz greater than or equal to 1.0 µm, preferably greater than or equal to 3.0 µm, and less than or equal to 50.0 µm, and/or the molding strip 12 could present rims 52 surrounding each of the cavities 18.

Although the present disclosure is described with reference to a specific embodiment, it is clear that various modifications and changes may be made to these embodiments without going beyond the general ambit of the invention as defined by the claims. Also, individual characteristics of the various embodiments mentioned can be combined in additional embodiments. Consequently, the description and the drawings should be considered in a sense that is illustrative rather than restrictive. For example, the molding apparatus 10 of FIGS. 1 and 2 has two rotary drive rollers 20 for the molding strip 12, but it could have three. It can be understood that the number of rollers and the way they are arranged is not limiting. The number of rollers and the way they are arranged may be varied in order to adapt to the length of the molding strip 12 and/or to various configurations of stations of the molding apparatus 10. For example, the rotor 22 could also be provided with motor-drive means, like the roller 24. Furthermore, the pitch P1 could be equal to the pitch P2, the pitch P1 could be strictly less than the pitch P2 when a rim surrounds each cavity, and conversely, when the inside face 14 of the molding strip 12 does not present any rims surrounding the cavities 18, the pitch P1 could be strictly greater than the pitch P2. It is also possible to envisage that two rows, taken in the longitudinal direction and that are immediately adjacent to each other, could be offset from each other in the longitudinal direction by a pitch that is different from one-half of the pitch P1. In the examples of FIGS. 5, 6A, 6B, 7A, and 7B, the rim 52 presents two maxima and two minima. These examples are not limiting.

It should also be observed that the figures are not reproduced to scale. Thus, for better understanding, certain details have voluntarily been enlarged so that they can be shown.

In one embodiment, the molding strip is made of nickel and has a nickel content greater than 90%. It is equally possible to envisage using strips made of copper, brass, or metal alloys. Furthermore, it is equally possible to envisage using molding strips made of steel only and that are perforated, e.g. molding strips made of stainless steel. It is also possible to envisage making the molding strip out of an optionally reinforced organic material, e.g. a molding strip based on rubber or a molding strip made of epoxy carbon or a woven or knitted textile belt or indeed a woven or knitted metal textile belt.

In this example, the retaining device with hooks is made out of a plastics material. The term "plastics material" is used to mean a thermoplastic material, more particularly a polyolefin material based on a homopolymer or a copolymer.

By way of example, the following list of plastics materials: linear low density polyethylene (LLDPE), low density polyethylene (LDPE), metallocene polyethylene (m-PE), high-density polyethylene (HDPE), ethylene vinyl acetate (EVA), et polypropylene (PP), having a molecular weight distribution that is monomodal or multimodal (e.g. bimodal), in particular a composition comprising LLDPE and a plastomer, in particular a plastomer based on polyethylene. It would also be possible to use polyimide (PA), polylactic acid (PLA), polyhydroxyalkanoates (PHA), polyvinyl alcohols (PVOH), polybutadiene styrene (PBS).

Various systems and methods compatible with the present disclosure are described in patent applications FR 16/53866, FR 16/53870, FR 16/53872, FR 16/53873, FR 16/53888, FR 16/53894 and FR 16/53897, which are incorporated in full by reference in this description.

The invention claimed is:

1. A molding apparatus for forming a retaining device, the molding apparatus comprising a molding strip and a molding support, the molding strip having an inside face, an outside face, and a plurality of through cavities extending from the outside face to the inside face, the molding strip extending in a longitudinal direction and presenting both a transverse direction perpendicular to the longitudinal direction, and also a height direction perpendicular to the longitudinal direction and to the transverse direction, the inside face being configured to press against a molding face of the molding support, wherein the inside face of the molding strip and/or the molding face of the molding support includes an array of passages, the array of passages forming vents and connecting together the cavities when the molding strip is pressed against the molding support.

2. A molding apparatus according to claim 1, wherein the inside face of the molding strip and/or the molding face of the molding support presents a maximum roughness height Rz that is greater than or equal to 1.0 μm, preferably greater than or equal to 3.0 μm, and less than or equal to 50.0 μm.

3. A molding apparatus according to claim 1, wherein the inside face presents a rim surrounding the open portion of each cavity and projecting from the inside face, the rims defining between them the array of passages, each rim presenting various heights, such that when the molding strip is pressed against the molding support, at least a portion of each rim is not pressed against the molding support, such that each cavity is in connection with the atmosphere via the array of passages.

4. A molding apparatus according to claim 3, wherein a maximum difference between two heights of a given rim of a cavity is greater than or equal to 1.0 μm, preferably greater than or equal to 2.0 μm, more preferably greater than or equal to 4.0 μm, and less than or equal to 100.0 μm, preferably less than or equal to 50.0 μm.

5. A molding apparatus according to claim 1, wherein the array of passages extends in the longitudinal direction.

6. A molding apparatus according to claim 1, wherein the array of passages extends in the transverse direction.

7. A molding apparatus according to claim 1, wherein each cavity defines a stem extending from the outside face towards the inside face and having a head-forming end extending away from the stem towards the inside face of the molding strip.

8. A molding apparatus according to claim 1, wherein each cavity of the molding strip is configured to form a preform of a retaining element.

9. A molding apparatus according to claim 1, wherein the molding support is a molding roller.

10. A molding apparatus according to claim 1, wherein the molding strip has 10 cavities/$cm^2$ to 500 cavities/$cm^2$.

11. A molding apparatus according to claim 10, wherein the molding strip has 250 cavities/$cm^2$±75 cavities/$cm^2$.

12. A molding apparatus according to claim 1, wherein each cavity has a height in the height direction greater than or equal to 5.0 μm, preferably greater than or equal to 20.0 μm, still more preferably greater than or equal to 100.0 μm, and less than or equal to 5000.0 μm, preferably less than or equal to 800.0 μm, still more preferably less than or equal to 500.0 μm.

13. A molding apparatus according to claim 1, wherein each cavity has a height in the height direction greater than 20.0 μm, and less than or equal to 500.0 μm.

14. A molding apparatus according to claim 1, wherein the molding strip comprises a material based on nickel.

15. A molding apparatus according to claim 1, wherein the molding strip presents a length in the longitudinal direction lying in the range 0.5 m to 5 m.

16. A molding apparatus according to claim 1, wherein the molding strip presents width in the transverse direction lying in the range 5 mm to 3000 mm.

17. A molding apparatus according to claim 1, wherein each cavity presents symmetry of rotation about an axis parallel to the height direction.

18. A molding apparatus according to claim 1, wherein a portion of the array of passages surrounding at least one of the cavities presents a shape that is substantially hexagonal.

19. A molding apparatus according to claim 3, wherein a maximum difference between the height of at least one of the rims and a height of a passage adjacent to said rim is less than or equal to 100.0 μm.

20. A molding apparatus according to claim 1, wherein each cavity of the molding strip may be configured to form a preform of a retaining element.

* * * * *